United States Patent
Martin

(10) Patent No.: US 6,839,819 B2
(45) Date of Patent: Jan. 4, 2005

(54) DATA MANAGEMENT APPLIANCE

(75) Inventor: Marcia Reid Martin, Longmont, CO (US)

(73) Assignee: Storage Technology Corporation, Louisville, CO (US)

(*) Notice: Subject to any disclaimer, the term of this patent is extended or adjusted under 35 U.S.C. 154(b) by 308 days.

(21) Appl. No.: 10/034,305

(22) Filed: Dec. 28, 2001

(65) Prior Publication Data

US 2003/0135704 A1 Jul. 17, 2003

(51) Int. Cl.[7] .......................... G06F 12/00; G06F 13/00
(52) U.S. Cl. ...................... 711/162; 711/100; 711/154; 711/163
(58) Field of Search ................................ 711/100, 105, 711/154, 162, 163; 713/200, 5

(56) References Cited

U.S. PATENT DOCUMENTS

| 5,086,502 A | | 2/1992 | Malcolm ..................... 395/575 |
|---|---|---|---|
| 5,586,264 A | * | 12/1996 | Belknap et al. ............. 725/115 |
| 5,809,527 A | * | 9/1998 | Cooper et al. .............. 711/133 |
| 5,809,543 A | * | 9/1998 | Byers et al. ................ 711/162 |
| 6,158,019 A | | 12/2000 | Squibb ......................... 714/13 |
| 2001/0044807 A1 | | 11/2001 | Kleiman et al. | |

FOREIGN PATENT DOCUMENTS

FR 2 746 526 A 9/1997

* cited by examiner

Primary Examiner—Tuan V. Thai
(74) Attorney, Agent, or Firm—Brooks Kushman P.C.

(57) ABSTRACT

The present invention is directed toward a data management appliance and ancillary technologies for replicating data written to a primary storage system. The data management appliance is a random-access storage system that at the logical block level replicates the contents of a primary storage system over time.

33 Claims, 10 Drawing Sheets

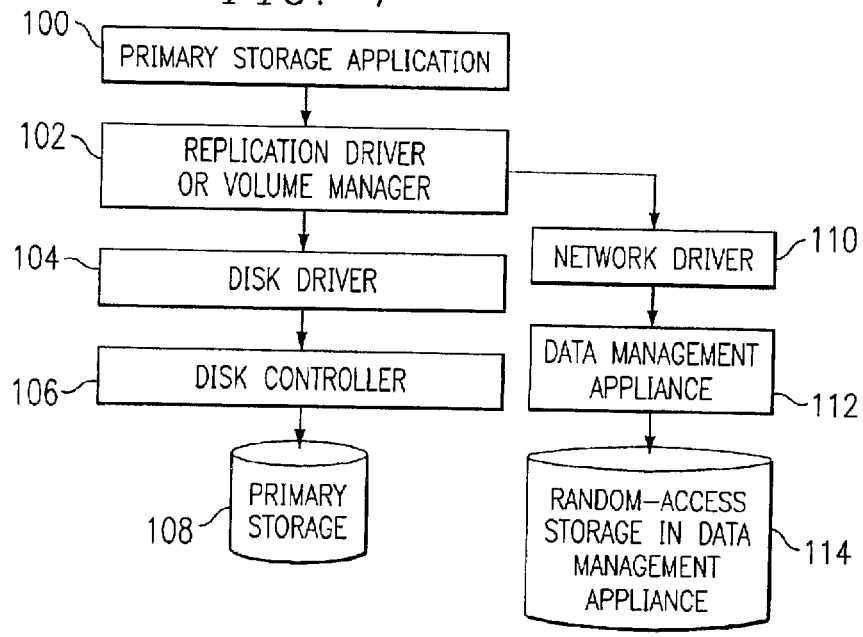
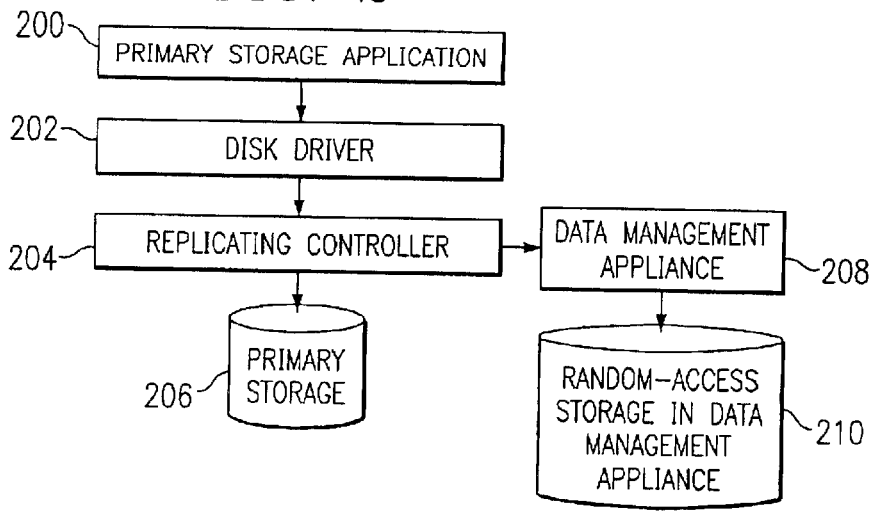
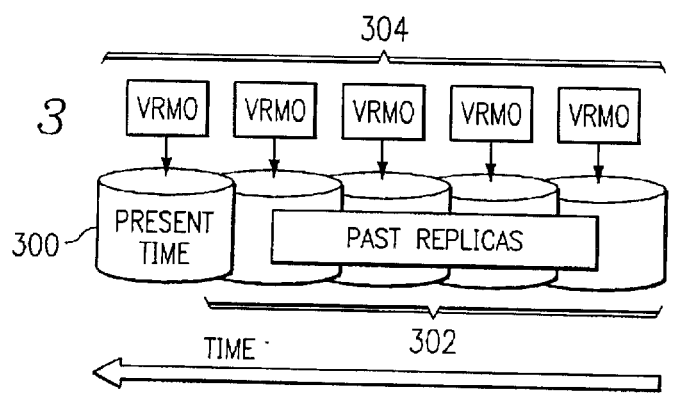

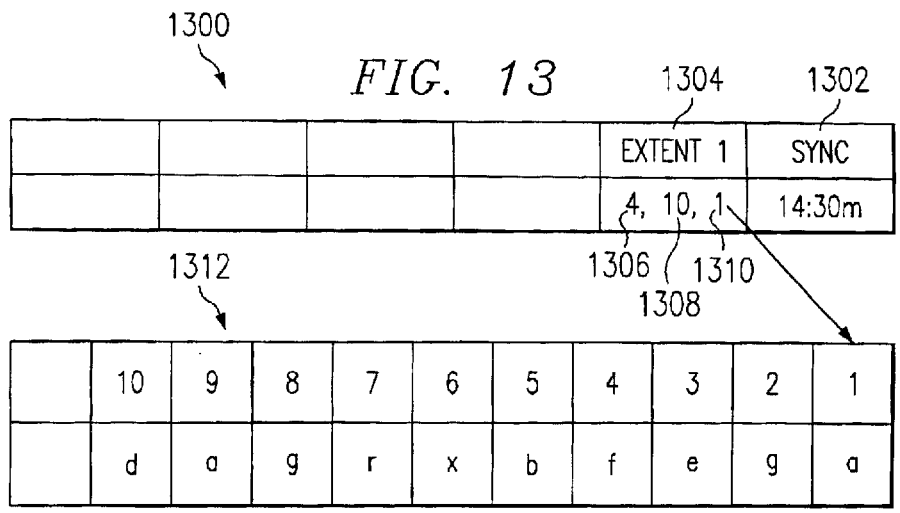
FIG. 13
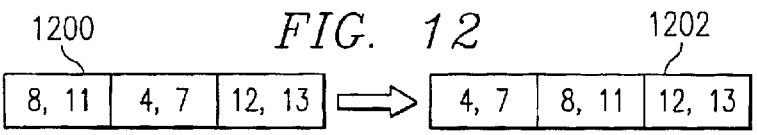
FIG. 12
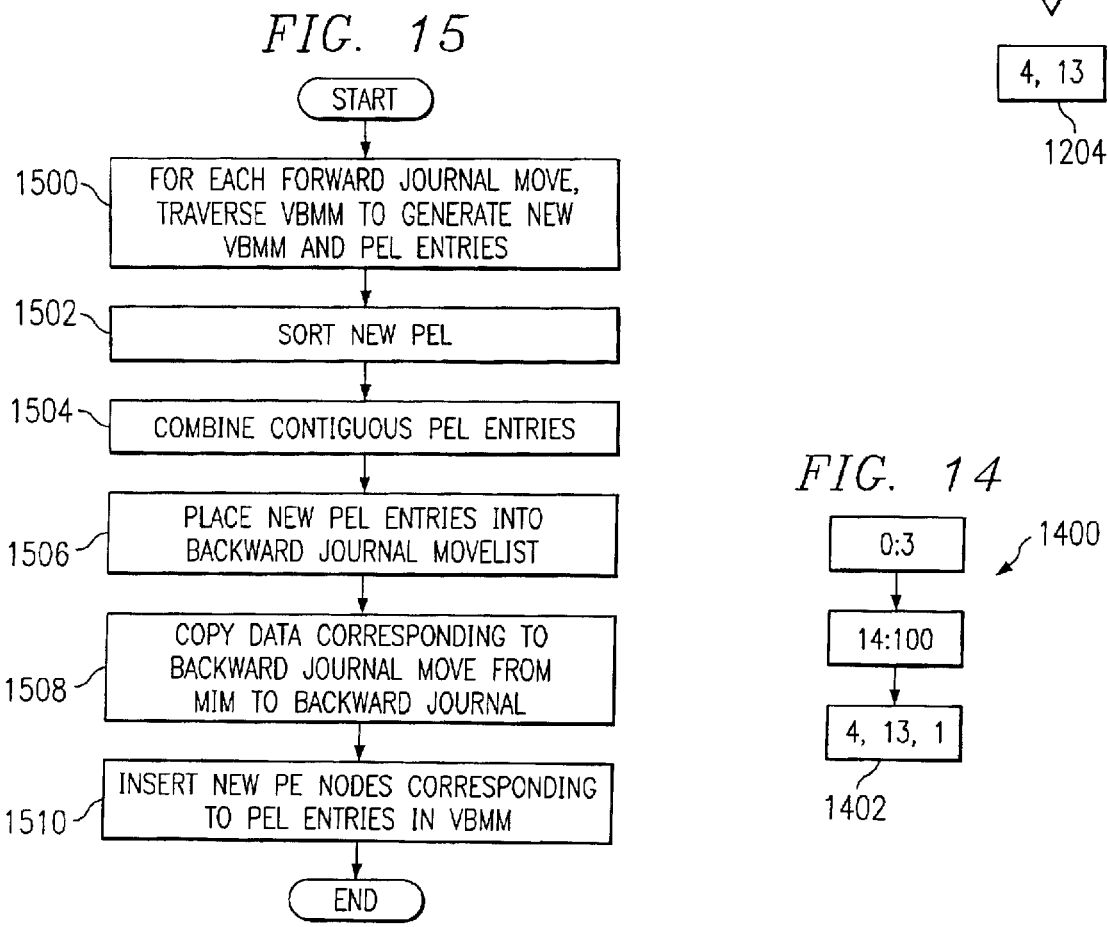
FIG. 15
FIG. 14

DATA MANAGEMENT APPLIANCE

FIELD OF THE INVENTION

The present invention is directed generally toward data storage and backup systems. More specifically, the present invention is directed toward a backup system that immediately backs up data written to a primary storage device to multiple "virtual mirrors," that reflect the changing state of the primary storage device over time.

BACKGROUND OF THE INVENTION

Humankind has always had a need to record information. Historians tell us that in ancient Mesopotamia, writing first emerged as a means of keeping records of livestock. As civilization progresses, so does the need to securely store larger amounts of information for longer periods of time. Whereas in ancient times, clay tablets sufficed for most storage needs, modern computerized storage systems are measured in such seemingly astronomical terms as gigabytes and terabytes. One example of this information storage explosion is the U.S. Internal Revenue Service's use of computers to store information regarding taxable gifts made over a person's lifetime. For most people living in the United States, gift taxes are not calculated or paid until death, so any information regarding taxable gifts must be maintained over a person's lifetime.

Although computerized storage is somewhat more robust than brittle clay tablets, the problem of maintaining reliable storage over a long period of time remains. For this reason, many, if not most, large-scale computing facilities periodically back up stored data to some redundant storage medium, such as to tapes. There are two types of backups that are generally performed in computer systems today. Full backup means making a redundant copy of a storage system in its entirety. Incremental backup, on the other hand, means making a redundant copy of only those portions of a storage system that have changed since the last backup. Many computing facilities make use of both full backup and incremental backup.

A number of problems exist with these backup methods, however. Firstly, a "backup window" of time must usually be available when computer applications are shut down so that a consistent image of the storage system can be made (i.e., so that what is being copied does not get overwritten by an application while the copy is being made). Second, even if no backup window is necessary, the backup process, when run as a batch operation, can steal CPU cycles from other processes running on the computer system. Third, so-called primary storage devices, such as disk, are today very large, so that backing up data sequentially to a secondary storage medium such as tape and recovering data from the tape are relatively slow operations. Fourth, since most backup systems today operate at the file-system level, backup systems must contend with complex directory-structure and security issues. Fifth, with backups being performed only periodically, there is a high risk of data loss, because data written between backups may be lost between backups. Sixth, existing replication solutions tend to be expensive. Seventh, costs associated with media and device incompatibilities are high.

In the database design field, recovery without a backup window is often accomplished through the use of write-ahead logging. Database transactions that can change database contents are recorded in a log before being completed in the main database. Another name for a log is "journal." If the database becomes corrupted, transactions can be "undone" or "redone" to restore the database to some previous uncorrupted state.

Another recovery technique used in the database field is "shadow paging." Shadow paging divides database contents into a series of pages. A directory is used to map logical addresses for pages into physical addresses on a storage device. When changes are made to the database, the pages are not overwritten, but new pages containing the changes are produced, and a new directory is created that points to the new pages instead. Recovery is performed by reverting to a directory from a previous, uncorrupted state in the database.

U.S. Pat. No. 5,086,502 to Malcolm extends the write-ahead logging concept to primitive disk I/O. Malcolm describes a system wherein write commands to a storage device in an IBM PC-type computer system are captured at the BIOS (basic input/output system) level and recorded in a journal. Write commands recorded in the journal are then used to restore the storage device to an earlier, uncorrupted state.

U.S. Pat. No. 6,158,019 to Squibb describes a method and apparatus for restoring an updated computer storage system from a journal of write events. Squibb describes process whereby events in an event journal may be used to create an event map and "delta" data structure, which may be merged with an original file stored on streaming media to generate a previous version of a file.

Both of these data replication strategies, however, involve elaborate steps of data reconstruction and use a disproportionately large amount of storage space over time. Thus, they can be unwieldy and expensive to maintain and use. Additionally, the Squibb and Malcolm systems place a heavy computational burden on the primary (host) computer system. What is needed is a data replication system that eliminates the backup window, is fast, and makes more efficient use of storage space, without placing a heavy computational burden on the primary or host computer.

SUMMARY OF THE INVENTION

The present invention is directed toward a data management appliance and ancillary technologies for replicating data written to a primary storage system. The data management appliance is a random-access storage system that at the logical block level replicates the contents of a primary storage system over time. A mirror-in-the-middle (MIM) included in the data management appliance is used to record an exact copy of the primary storage system at some fixed point in time.

Atomic write events are recorded in a "forward journal" by the appliance immediately, so that applications are not interrupted. An atomic event or transaction is one that cannot be divided into parts; an atomic event or transaction is either performed in its entirety or not performed at all. At specified points in time, forward journal entries are used to produce snapshots, reflecting the change in the primary storage system over a period of time. These snapshots are recorded in a "backward journal" and represent a coarser level of backup granularity, much like an incremental backup. As snapshots are produced, the forward journal entries may be applied to the MIM to update its contents and finally discarded to save space.

A virtual recovery mapping object (VRMO) is used to map logical addresses at a particular point in time to their physical locations within the data management appliance. Thus, VRMOs act as an index, allowing for quick, random-access recovery of data. In one embodiment, a VRMO is composed of a multi-way tree, which allows logical address translation in logarithmic time.

As the data management appliance allows the contents of a storage system over a period of time to be examined, the data management appliance may be applied to the detection and/or forensic investigation of data events, such as a database corruption or viral infection.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an overall view of the operation of a data management appliance in accordance with a preferred embodiment of the present invention;

FIG. 2 is an overall view of the operation of an alternative embodiment of the present invention in which commands are replicated using a replicating controller;

FIG. 3 is a diagram providing a conceptual view of the replicated storage provided by a data management appliance in accordance with a preferred embodiment of the present invention;

FIG. 12 depicts a process of generating a backward movelist from a PEL (physical extent list) in accordance with a preferred embodiment of the present invention;

FIG. 13 is a diagram depicting incorporation of a backward movelist into a backward journal in accordance with a preferred embodiment of the present invention;

FIG. 14 is a diagram demonstrating insertion of moves from a backward movelist into a new VBMM in accordance with a preferred embodiment of the present invention;

FIG. 15 is a flowchart representation of a process of generating a snapshot, including a VBMM and backward journal entries, according to a preferred embodiment of the present invention;

DETAILED DESCRIPTION OF THE PREFERRED EMBODIMENT

Figure 4:
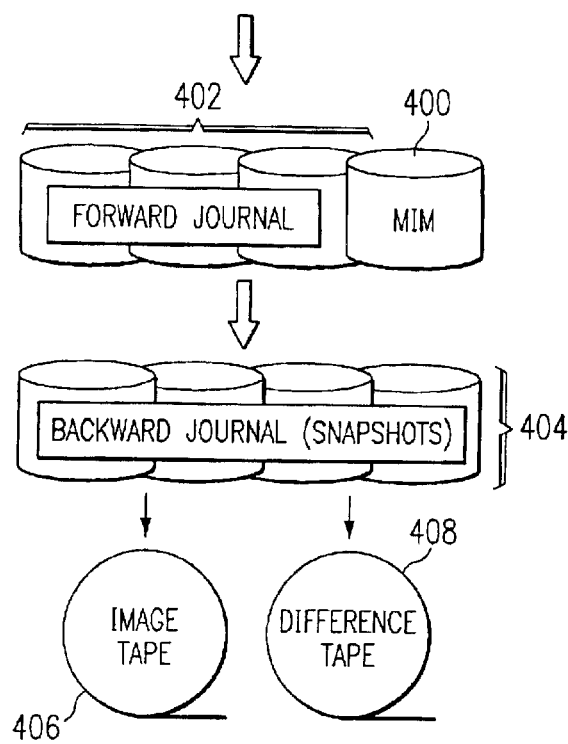
FIG. 4 depicts a process of replicating data within a data management appliance in accordance with a preferred embodiment of the present invention.

FIG. 1 is a diagram providing an overall view of the operation of a preferred embodiment of the present invention. A primary storage application 100, residing on a host computer system, submits a command to a replication driver/volume manager 102 to store data to primary storage 108. Replication driver/volume manager 102 relays the request both to disk driver 104 and network driver 110. Disk driver 104 is device driver code that operates disk controller 106, which in turn controls primary storage 108, which is in this case a disk drive, although many different alternative random-access storage devices could be used in place of primary storage 108.

Network driver 110 is device driver code that controls access to a computer network. Network driver 110 relays the submitted storage command to data management appliance 112, which is located on a network associated with the host computer system. Data management appliance 112 is an intelligent peripheral device that presents the appearance on the network of a disk array or arrays or other random-access storage medium. Data management appliance 112 contains control circuitry and also contains its own random-access storage 114. The control circuitry may be, for instance, an embedded stored-program computer, such as a microprocessor and memory or a microcontroller. The stored program may be stored in firmware or loaded from a storage medium, such as floppy disk. Data management appliance 112, through control circuitry, uses random-access storage 114 to replicate the information stored on primary storage 108. As will be seen, data management appliance 112 not only provides a replica of the current contents of primary storage 108, but it also contains information that it can use to reconstruct replicas of previous contents of primary storage 108 at various points in time.

FIG. 2 is a diagram of an alternative embodiment of the present invention, in which the replication driver is replaced with replicating hardware. Primary storage application 200 issues a write command to disk driver 202, which is device driver code. Disk driver 202 controls replicating controller 204, which is a hardware disk controller that controls primary storage 206, but which has the additional feature of replicating storage commands submitted to primary storage 206 and providing the replicated commands to data management appliance 208, which replicates the data contained on primary storage 206 on random-access storage 210.

FIG. 3 is a diagram providing a conceptual view of the replicated storage provided by data management appliance 112 (or 208). Data management appliance 112 is programmed to behave as though it stores a number of duplicate copies (replicas) of primary storage device 108 as it existed at certain points in time (replicas 300, 302). Data management appliance 112 can provide a near-time (i.e., near the present time) replica (300) of primary storage device 108 or any one of a number of virtual views or mirrors of earlier versions of the data stored on primary storage device 108. Each of these virtual mirrors is accessed using one of a number of virtual recovery mapping objects (VRMOS) 304, which each represent a different point in time.

Data may be read from data management appliance 112 by either specifying that data management appliance 112 behave (for reading purposes) as a copy of primary storage device 108 at a specified time (e.g., during the mounting process), or by specifying read commands that contain an additional time field. For example, to retrieve the contents of block 5 at some time "t," either data management appliance 112 could be directed to behave as if it were time "t," in which case any read command to any block would result in the data that was present at time "t," or a read command that simply stated "retrieve block 5 from time 't'" could be issued instead.

FIG. 4 depicts a process of replicating data within a data management appliance in accordance with a preferred embodiment of the present invention. The replication process centers around "mirror in the middle" (MIM) 400, which initially stores an identical copy of the data stored on the primary storage device (108 in FIG. 1). MIM 400 is a reserved portion of random-access storage 114, which is identical in capacity and address space as primary storage 108. After an identical copy of primary storage 108 has been established on MIM 400, subsequent write commands issued to change the data contents of primary storage device 108 are archived sequentially in forward journal 402, without changing the data stored in MIM 400. Thus, forward journal 402 contains the entire sequence of write commands issued since MIM 400 was identical with primary storage device 108. Forward journal 402 and MIM 400 are both stored in random-access storage 114.

After the passage of a certain period of time, either a pre-defined time interval or when the portion of random-access storage 114 devoted to forward journal 402 is exhausted of space, a portion of the archived commands in forward journal 402 consisting of the oldest command in the journal and some number of commands following the oldest command in sequence, up to a point in time determined by the archiving policy are combined so as to obtain a net change taking place during the time period. For example, if storage addresses 1–5 are written to with the string "ABCDE," then addresses 2–4 are rewritten with "ZXC," the net change to the data is to write "AZXCE" to addresses 1–5. As shown in FIG. 13, these changes can be expressed in terms of a "backward movelist move" including a logical address within the logical address space of primary storage 108 where the change occurs, a length of the change, and an address of a location within the forward journal at which the newly-written data is stored.

Next, the starting addresses and lengths representing the net change are used to retrieve data from MIM 400 to derive an inverse of the net change. For example, if addresses 1–5 originally contained "12345," and the net change is to write "AZXCE" to addresses 1–5, then the inverse of the net change is to write the original "12345" to addresses 1–5, which reverses the net change made. This inverse net change is then recorded as a "snapshot" in backward journal 404 and MIM 400 is updated to reflect the determined net change.

Thus, recent copies of primary storage device 104 may be retrieved by applying subsequent changes from journal 402 to the data stored in MIM 400, while more distant copies may be retrieved by applying the reverse changes (snapshots) to MIM 400. Since primary storage device 108 is journaled with finer granularity for more recent transactions than for more distant transactions, a balance is struck between the ability to restore data at an exact moment in time and the ability to save space by storing a sparse number of snapshots of the data.

The system described in FIG. 4 can be further enhanced by allowing for the archiving of past-time data onto removable media, such as image tape 406 and difference tape 408. An image tape, such as image tape 406, containing a complete copy of primary storage device 104 at a particular time, can be assembled from MIM 400 and snapshots 404. A difference tape, such as difference tape 408, archiving the net differences between an image tape and successive snapshots, can also be generated. Because they are stored on removable media, image tape 406 and difference tape 408 can be stored away (e.g., in a tape silo or library unit) for future use without tying up system resources, such as tape or disk drives.

Figure 5:
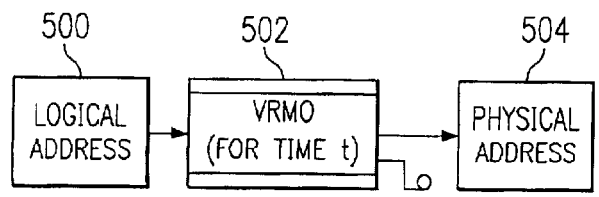
FIG. 5 depicts the basic operation of a virtual recovery mapping object (VRMO) in accordance with a preferred embodiment of the present invention.

FIG. 5 depicts the basic operation of a virtual recovery mapping object (VRMO) in accordance with a preferred embodiment of the present invention. As was shown in FIG. 4, portions of replicated past data may be stored in the journal or in snapshots. Thus, a "virtual replica" of the primary storage device will generally be composed of various fragments stored across snapshots. To access the virtual mirror, one must identify where each piece of data is stored within the various snapshots in the backward journal, in the forward journal, or on the MIM.

As FIG. 5 shows, VRMO 502, which is associated with a particular time "t," is a data structure that maps a logical address (500), representing the location on primary storage device 108 of the data to be accessed, to a physical address (504), representing the position of the data within a snapshot or journal. VRMO 502 will preferably embody an index for rapid lookup of physical address 504 given logical address 500. VRMO 502 is preferably stored in memory contained within the control circuitry of data management appliance 112.

Figure 6:
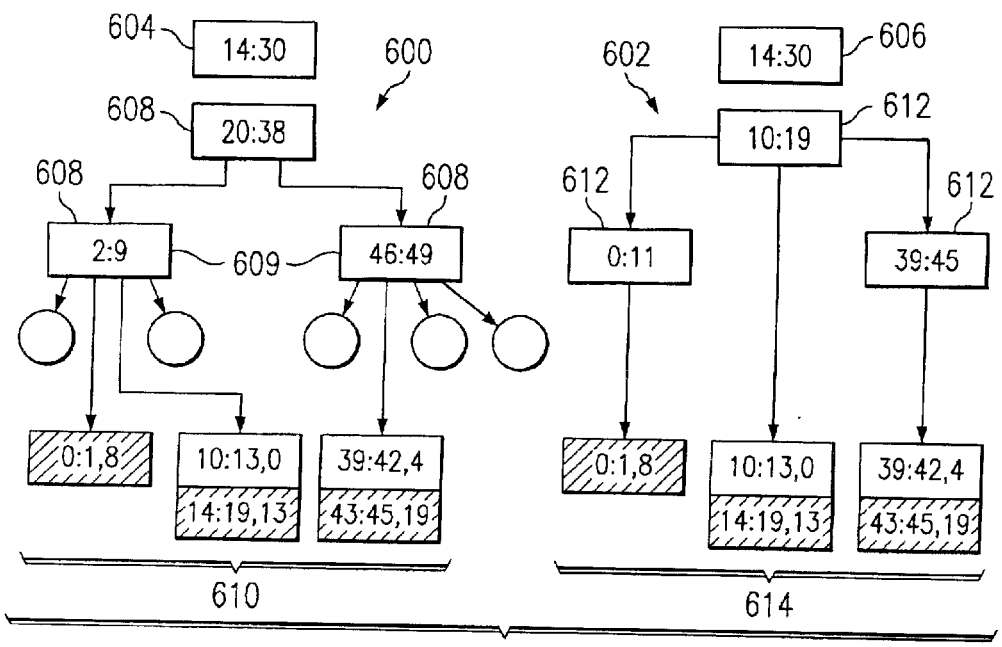
FIG. 6 is a diagram depicting two VRMO types usable in a preferred embodiment of the present invention.

FIG. 6 is a diagram depicting two VRMO types usable in a preferred embodiment of the present invention, VBMM (Virtual Block Map—MIM) 600 and VBMJ (Virtual Block Map—Journal) 602. VBMM 600 and VBVMJ 602 are depicted here as binary search trees, although a multi-way tree structure such as that depicted in FIG. 19 could be used as well. Search trees, and in particular binary search trees, are a common data structure for indexing data having an ordering characteristic and are well known in the computer programming art. VBMM 600 and VBMJ 602 are both marked with timestamps (604 and 606) denoting the points in time represented by VBMM 600 and VBMJ 602.

VBMM 600 is "MIM-centric." This means that VBMM 600 is indexed with respect to blocks of data contained on MIM 400. Tree nodes 608 of VBMM 600 represent contiguous regions of the logical address space that are contained on MIM 400. Leaf nodes 609 point to physical extent lists (PELs) 610, which represent portions of the logical address space, adjacent to the leaf-node addresses, that are stored in journal entries (snapshots from the backward journal or segments from the forward journal).

In VBMM 600, logical addresses are resolved into physical addresses by first traversing tree nodes 608 to attempt to find the logical address contained on MIM 400. If the logical address being sought is contained in an address range associated with a tree node, the logical address simply resolves into an identical physical address on MIM 400, since the data being sought is located on MIM 400. If, on the other hand, the address being sought is not contained within a tree node, the proper physical extent list adjacent to the last tree node searched will be searched for the physical address within the journal that corresponds to the logical address being sought. It should be noted that physical extent lists 610 are pointed to by leaf nodes 609 as left and right children, just as if each of the physical extent lists were inserted as tree nodes within the tree structure. For example, a physical extent list containing addresses that are less than that of its parent tree node will be the left child of that parent tree node.

VBMJ (Virtual Block Map—Journal) 602 is, in contrast, journal-centric. Tree nodes 612 represent ranges of logical addresses contained within journal entries. Tree nodes 612 are mapped in one-to-one correspondence with physical extent lists 614, which, like those of VBMM 600, map logical addresses into physical addresses located within journal entries.

Resolving a logical address into a physical address using VBMJ 602 is straightforward. If the address in question resides within the journal, traversing the tree of VBMJ 602 will result in finding a tree node and corresponding physical extent list mapping the logical address into its physical location in the journal. If the address resides on the MIM instead, the tree search will fail. In that case, the proper physical address is on the MIM and is equivalent to the logical address.

Figures 7, 8:
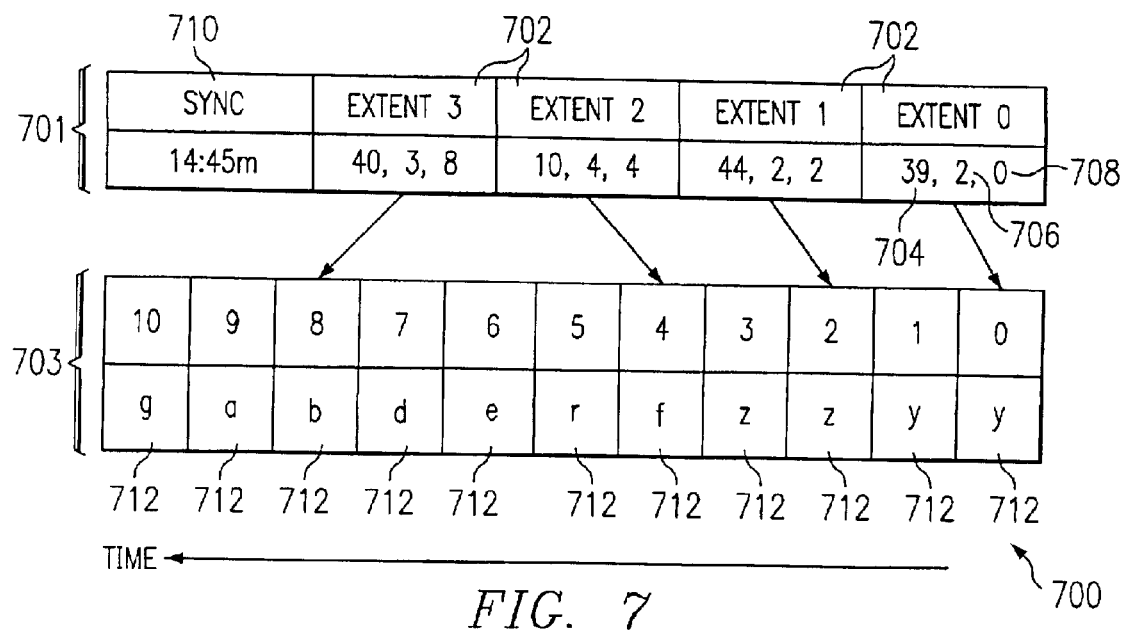
FIG. 7 is a diagram of a forward journal in accordance with a preferred embodiment of present invention.
FIG. 8 is a diagram of a mirror-in-the-middle (MIM) in accordance with a preferred embodiment of the present invention.

FIG. 7 is a diagram of a forward journal 700 in accordance with a preferred embodiment of present invention. Forward journal 700 is made up of two queues, 701 and 703. Queues 701 and 703 are, in a preferred embodiment, circular queues, to minimize the amount of persistent directory structures needed to decipher the state of the queue after an interruption in power. A circular queue only needs to persist pointers to the head and tail of the queue to be fully recoverable. Queues, and in particular circular queues, are well known data structures within the computer programming art.

The elements of queue 701 are composed primarily of extent descriptors 702. Each of extent descriptors 702 describes a contiguous extent of data within the logical address space. Each of extent descriptors 702 includes a logical start address 704, a length 706 and a physical address 708. Logical start address 704 represents the starting address of the extent of data within the logical address space. Length 706 represents the length of the extent of data. Physical address 708 represents a physical address within queue 703 in which the extent is stored. Queue 701 may include one or more sync indicators, such as sync indicator 710, which act as time markers.

Queue 703 is made up of extents 712. Extents 712 represent the actual data written to primary storage 108 and replicated by data management appliance 112 in forward journal 402 (see FIGS. 1 and 4).

FIG. 8 is a diagram of a MIM 800 in accordance with a preferred embodiment of the present invention. MIM 800 is divided into storage units or blocks such as block 804. The storage units or blocks can be any fixed-size data aggregation and depend on the organization of the primary storage. Block 804, like the other storage units in MIM 800, has a logical address 802 associated with it. These logical addresses are the same logical addresses within the aforementioned logical address space. Thus, MIM 800 represents the entire logical address space. The same logical address space is used to represent storage locations within the primary storage.

Figure 9:
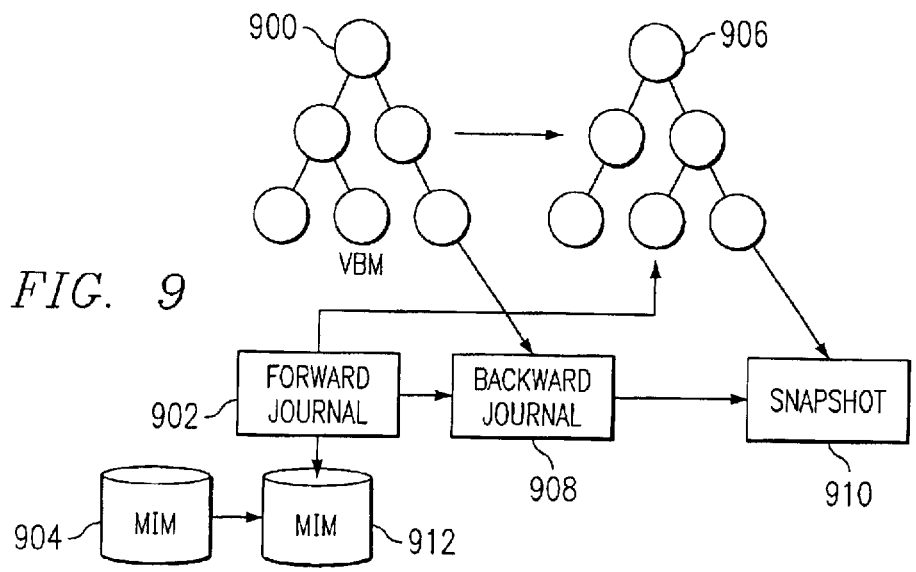
FIG. 9 is a diagram representing an overall view of a process of updating a MIM and generating snapshots in accordance with the preferred embodiment of the present invention.

FIG. 9 is a diagram representing an overall view of a process of updating a MIM and generating snapshots in accordance with the preferred embodiment of the present invention. As time progresses and data is written into primary storage 108 and forward journal 402, a point will be reached at which a snapshot is produced. Preferably, the appliance selects a point at which a sync indicator such as sync indicator 710 occurs in the forward journal to be the endpoint of the snapshot.

VRMO 900 maps addresses from the logical address space to physical locations on the MIM (400 in FIG. 4) or the backward journal (404 in FIG. 4). At the very beginning of the data replication process, MIM 400 and primary storage 108 are identical. Thus initially, VRMO 900 maps logical addresses into physical locations on MIM 400 only.

When an update event occurs, outstanding forward journal entries 902 are used to modify VRMO 900 to produce a new VRMO 906. Meanwhile, VRMO 900 and forward journal entries 902 are used to produce new backward journal entries 908. Backward journal entries 908 and VRMO 906 define a snapshot 910. Finally, MIM contents 904 are updated using forward journal entries 902 to produced new MIM contents 912, thus bringing MIM 400 forward in time, particularly, so as to represent the point in time indicated by sync indicator 710.

Figure 10:
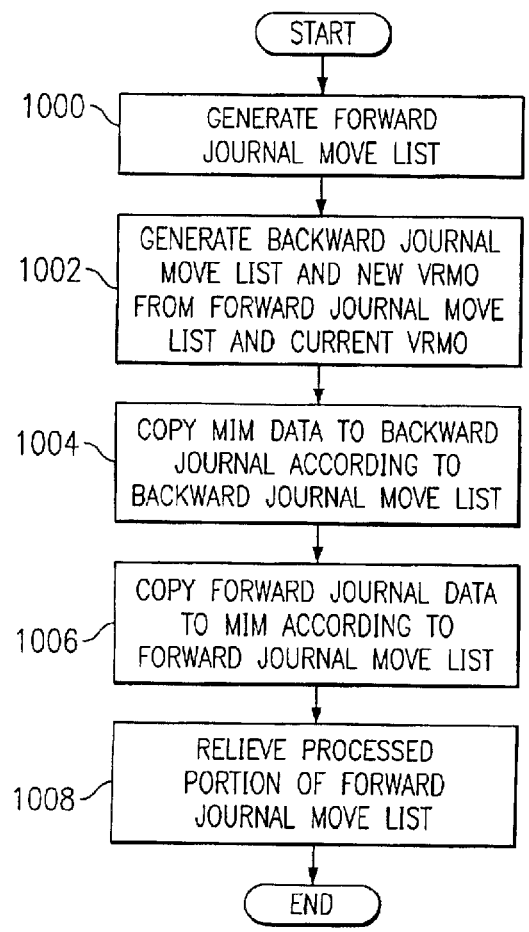
FIG. 10 is a flowchart representation of a process of generating a new snapshot and bringing a MIM into synchronization with primary storage in accordance with a preferred embodiment of the present invention.

FIG. 10 is a flowchart representation of a process of generating a new snapshot and bringing a MIM forward in time in accordance with a preferred embodiment of the present invention. First, a forward journal move list is generated from the forward journal (step 1000). This forward journal move list contains the extents of all outstanding journal entries from queue 701 in FIG. 7. Next, a backward journal move list is generated from the forward journal move list in current VRMO (step 1002). In addition, a new VRMO is also generated (step 1002). The backward journal move list contains extents, just as the forward journal move list. Unlike the forward journal move list, however, the backward journal move list represents locations on MIM 400 that will be overwritten when MIM 400 is brought forward in time. These locations must be preserved in backward journal to allow previous versions of the contents of primary storage 108 to be recovered, particularly, to allow the point in time represented by the MIM immediately before the MIM update event to continue to be recoverable. Thus, these locations are copied from the MIM into the node address range. Table I, below, is a decision table showing the proper actions associated with each degree of overlap between the input range and the node range. The abbreviations MLS and MLE refer to the starting and ending addresses of the range represented by the input move from the movelist and VBS and VBE refer to the starting and ending addresses of the range represented by the current node.

TABLE I

Decision Table for VBMM Update

| Decision Points | | | | Outcomes | |
|---|---|---|---|---|---|
| Start fact | End fact | Left recursion | Right recursion | VBMM node modification | Emit physical extent list entry |
| Don't Care | MLE < VBS | [MLS, MLE] | None | None | None |
| MLS > VBE | Don't Care | None | [MLS, MLE] | None | None |
| MLS = VBS | MLE = VBE | None | None | Delete | [MLS, MLE] |
| MLS = VBS | MLE > VBE | None | [VBE + 1, MLE] | Delete | [MLS, VBE] |
| MLS = VBS | MLE < VBE | None | None | Shrink [MLE + 1, VBE] | [MLS, MLE] |
| MLS > VBS | MLE = VBE | None | None | Shrink [VBS, MLS − 1] | [MLS, MLE] |
| MLS > VBS | MLE > VBE | None | [VBE + 1, MLE] | Shrink [VBS, MLS − 1] | [MLS, VBE] |
| MLS > VBS | MLE < VBE | None | None | Split [VBS, MLS − 1] [MLE + 1, VBE] | [MLS, MLE] |
| MLS < VBS | MLE = VBE | [MLS, VBS − 1] | None | Delete | [VBS, MLE] |
| MLS < VBS | MLE > VBE | [MLS, VBS − 1] | [VBE + 1, MLE] | Delete | [VBS, VBE] |
| MLS < VBS | MLE < VBE | [MLS, VBS − 1] | None | Shrink [MLE + 1, VBE] | [VBS, MLE] | backward journal according to the backward journal move list (step 1004). Next, MIM 400 is updated to reflect each of the write commands contained in the forward journal move list (step 1006). Finally, the portion of the forward journal that was used to update the MIM is now relieved or recycled to make room for new incoming journal transactions (step 1008).

Figure 11:
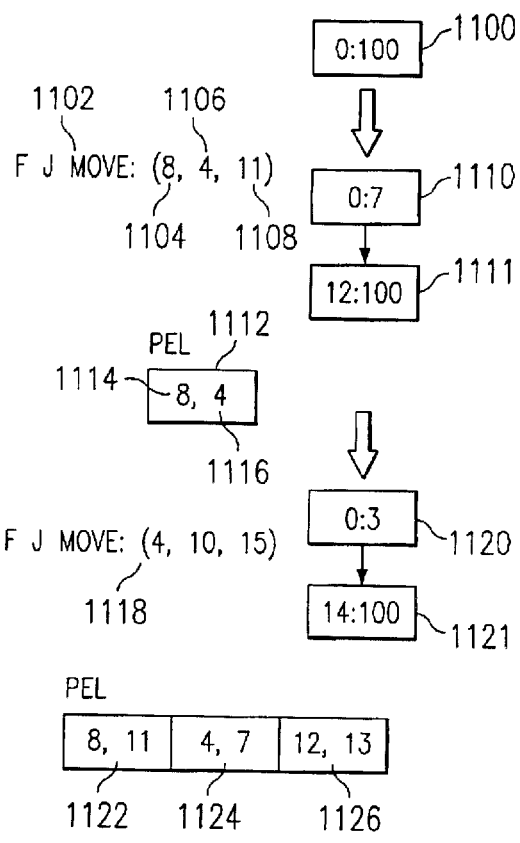
FIG. 11 is a diagram depicting a process of generating a VBMM in accordance with a preferred embodiment of the present invention

FIG. 11 is a diagram depicting a process of generating a VBMM in accordance with a preferred embodiment of the present invention. Initially the VBMM consists of a single node 1100 representing the address range of the entire logical address space. The VBMM is constructed by applying a recursive algorithm to divide node 1100 into a tree of nodes covering smaller ranges. The recursive algorithm takes as its input a single address range representing a move from the forward move list and a current node.

At each node in the current VBMM, the range of the node is compared with the input range. Depending on how or if the ranges overlap, the current VBMM node may reduced in size, deleted, or split. The algorithm may then call itself recursively to traverse the left and/or right children of each node until the leaves of the tree are reached. Also, a physical extent list (PEL) is generated, which will become the backward journal movelist. PEL entries will be generated at each node where the input address range overlaps with the Turning now to the example in FIG. 11, a first input move 1102 is taken from the forward movelist. Move 1102 includes a starting logical address 1104, a length of data to be written 1106, and a physical address 1108 within the forward journal where the data is stored. As move 1102 represents a write to an address range that is fully contained within the address range of node 1100, node 1100 is split into two nodes, 1110 and 1111. A PEL entry 1112 is also generated, containing a logical starting address 1114 and ending address 1116.

Next, a new move 1118 is submitted to the algorithm. As the range described in move 1118 overlaps the end of the range in node 1110, node 1110 is reduced in size to generate node 1120 and PEL entry 1124 is generated, according to the appropriate decision table rule from Table I above.

The algorithm is then called again (right-recursively) with the adjusted input range of (8:13). As this range overlaps that of node 1111 at the beginning of node 1111's range (12:100), node 1111 is shortened in range to produce node 1121 and a new PEL entry 1126 is generated.

FIG. 12 depicts a process of generating a backward movelist from a PEL 1200 in accordance with a preferred embodiment of the present invention. First, PEL 1200 is sorted in ascending order by starting address to achieve PEL 1202. Then, those series of PEL entries representing a contiguous block of logical addresses are combined into a single entry (e.g., 1204).

This newly formed backward movelist can then be incorporated into the backward journal as shown in FIG. 13. The entries (moves) from the backward movelist (e.g., 1204) are inserted into a first queue 1300. A sync marker 1302 represents the beginning of backward journal entries for the present snapshot. Backward journal entries are written as extent descriptors, such as extent descriptor 1304. Extent descriptor 1304 contains a logical starting address 1306, a length 1308, and a physical address 1310. Starting address 1306 and length 1308 are derived from backward move 1204. Physical address 1310 refers the starting location within a second queue 1312 corresponding to starting address 1306. Data at logical starting address 1306 is copied from the MIM and into second queue 1312 at physical address 1310.

Finally, as shown in FIG. 14, each of the moves in the backward movelist (e.g., move 1204) are inserted into the new VBMM (1400) as "physical extent nodes" (e.g., 1402), to data stored in the backward journal to be located using VBMM 1400.

FIG. 15 is a flowchart representation of a process of generating a snapshot, including a VBMM and backward journal entries, according to a preferred embodiment of the present invention. For each forward journal entry, the VBMM (which initially contains a single node representing the entire logical address space) is traversed and new VBMM nodes and PEL entries are generated according to the decision table above (step 1500). The new PEL is sorted (step 1502). Next, contiguous PEL entries are joined together (step 1504). The new PEL entries are then placed into a backward journal movelist (step 1506). Data corresponding to the backward journal entries is then copied from the MIM into the backward journal (step 1508). Finally, the new PEL entries are inserted into the VBMM tree as physical extent nodes (step 1510).

When all of the journal entries that are to be accounted for in a single snapshot have been placed into the backward journal and VBMM (or VBMJ), we say the snapshot is "closed." In practice, we can perform several synchronization events (where we create backward journal entries and update the MIM) while the snapshot is still "open." Further, even if the snapshot is closed, when data from a particular snapshot gets updated, and thus overwritten on the MIM, the VBMM (or VBMJ) of the older snapshot can no longer rely on the MIM and must be updated to point to a copy of the overwritten data in the backward journal.

Figure 16:
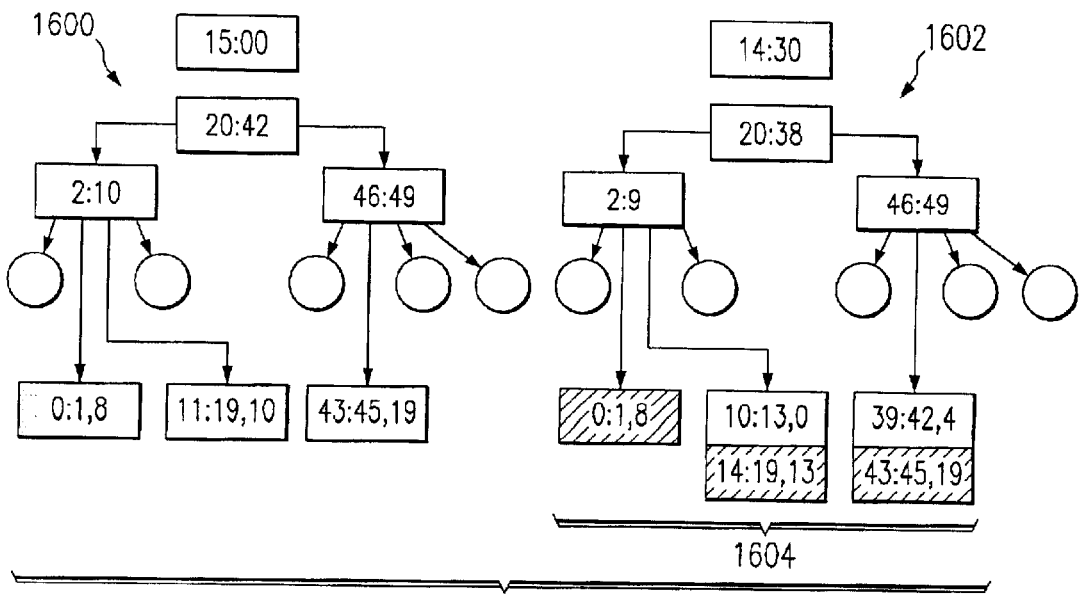
FIG. 16 is a diagram depicting a process of updating an older VBMM with a backward movelist in accordance with a preferred embodiment of the present invention.

FIG. 16 depicts a situation in which a VBMM 1600 for a snapshot is modified to generate a new VBMM 1602 for the snapshot when a synchronization event occurs. What happens is this: The algorithm just mentioned for producing a new VBMM is called, just as if the VBMM was new, except for two differences. The first and most obvious difference is that the old VBMM is traversed, rather than the original single node. The second difference is that the new physical extent nodes (1604), although they may refer to portions of the logical address space that are contiguous with older physical extent nodes, will refer to physical addresses in the backward journal that are not contiguous with those of the older physical extent node. Thus, new physical extent nodes 1604 will have to coexist in a sorted physical extent list (PEL) at the leaves of the tree, but not be combined with older physical extent nodes representing adjacent locations within the logical address space.

Eventually, as more data in a snapshot gets moved from the MIM to the backward journal, it is no longer efficient to traverse the entire VBMM to the leaves to locate data in the journal. In such a case, the VBMM can be converted into a VBMJ. Referring now to FIG. 6, the process for converting a VBMM (600) to a VBMJ (602) is straightforward. First, all of the PELs (614) in the VBMM are collected. For each PEL, a VBMJ node (e.g., VBMJ nodes 612) is created representing an address range where the starting address of the range is the starting address of the first entry in the PEL and the ending address is the ending address of the last entry of the PEL, and where each VBMJ node points to its respective PEL. Finally, the VBMJ nodes are inserted into the new VBMJ tree.

Just as with VBMMs, VBMJs have an algorithm for updating the VBMJ to point to entries in the backward journal in the event that that data is overwritten in the MIM. An example of this algorithm is provided in FIG. 17. As with the VBMM algorithm, the VBMJ update algorithm involves applying rules from a decision table at each node encountered during a traversal of tree nodes. Unlike the VBMM algorithm, however, three additional data structures are needed for the VBMJ algorithm.

Since the nodes of a VBMJ represent extents within the backward journal, as more data becomes copied into the backward journal, the nodes of the VBMJ are enlarged or merged, unlike the VBMM where nodes are split or reduced. It is necessary to store information regarding the nodes and physical extents that will be combined in these three auxiliary data structures. A collapse set C is a set of logical address ranges to be combined into a single node. A collapse set physical extent set CP is a set of physical extent nodes to be included in the physical extent list (PEL) for the node generated from collapse set C. Backward journal movelist candidate set BJMC stores a set of logical address ranges to be converted into backward journal extents.

As was stated earlier, the algorithm progresses by traversing the VBMJ tree, applying decision rules at each node according to the degree and type of overlap of the input move address range ([MLS, MLE]) and the address range for the current node ([VBS, VBE]). The decision rules for the VBMJ algorithm are listed in Table II below:

TABLE II

Decision Table for VBMJ Update

Decision Points

| Start fact | End fact | Outcomes |
|---|---|---|
| Don't Care | MLE < VBS−1 | Execute decision table for [MLS, MLE] and left child. |
| Don't Care | MLE = VBS−1 | Add current node to C. Execute decision table for [MLS, MLE] and left child. |
| MLS > VBE+1 | Don't Care | Execute decision table for [MLS, MLE] and right child. |
| MLS = VBE+1 | Don't Care | Add current node to C. Execute decision table for [MLS, MLE] and right child. |
| MLS => VBS | MLE =< VBE | End decision table processing. This movelist entry does not affect this snapshot, since the information from the MIM is already stored in the journal. |
| MLS => VBS but <= VBE | MLE > VBE | Add current node to C. Execute decision table for [VBE+1, MLE] and right child. |
| MLS < VBS | MLE <= VBE but => VBS | Add current node to C. Execute decision table for [MLS, VBS−1] and left child. |
| MLS < VBS | MLE > VBE | Add current node to C. Execute decision table for [MLS, VBS−1] and left child. Execute decision table for [VBE+1, MLE]. |

When a recursion is ordered, but the child pointer in the indicated direction is NULL (i.e., the tree traversal has reached a leaf node, and the ordered recursion cannot be performed, since the proper child node for further recursion does not exist), then the input range being processed ([MLS, MLE]) is added to C and a corresponding physical extent is added to CP. The current input range is also added to BJMC.

Once the VBMJ has been traversed using the decision rules in Table II, the collapse set and affiliated data structures are processed to produce the new VBMJ and backward journal entries. First a new VBMJ node is created but not added to the VBMJ. This node is given an address range that is equivalent to the "range of C", which can be denoted R(C). R(C) has as its starting address the lowest starting address of the address ranges in C; R(C) has as its ending address the greatest starting address of the address ranges in C (this is because C represents a number of ranges that form a contiguous block of address space).

The PEL of the new VBMJ node is then made to contain all of the physical extents represented in CP, sorted in ascending order by logical starting addresses. Next, all of the VBMJ nodes in the VBMJ corresponding to address ranges contained in C are deleted to make room. Then the new VBMJ node is inserted into the VBMJ to replace the deleted VBMJ nodes.

To complete the synchronization process, new backward journal entries must be created and the MIM updated in accordance with the forward journal entries. This is done by sorting and combining the BJMC set using the process depicted in FIGS. 12 and 13. The new physical extents in the VBMJ that were created to accommodate the new backward journal entries are then updated to point to the physical addresses within the backward journal at which the snapshot data copied to the backward journal from the MIM resides.

Once a VBMJ has been updated, updating VBMJs representing older snapshots is easy. Instead of processing the forward journal movelist, the backward journal movelist is used in its place and the same algorithm applied, with an exception being that the generated physical extent nodes are made to point to data already within the backward journal, rather than recopying the data from the MIM.

Figure 17:
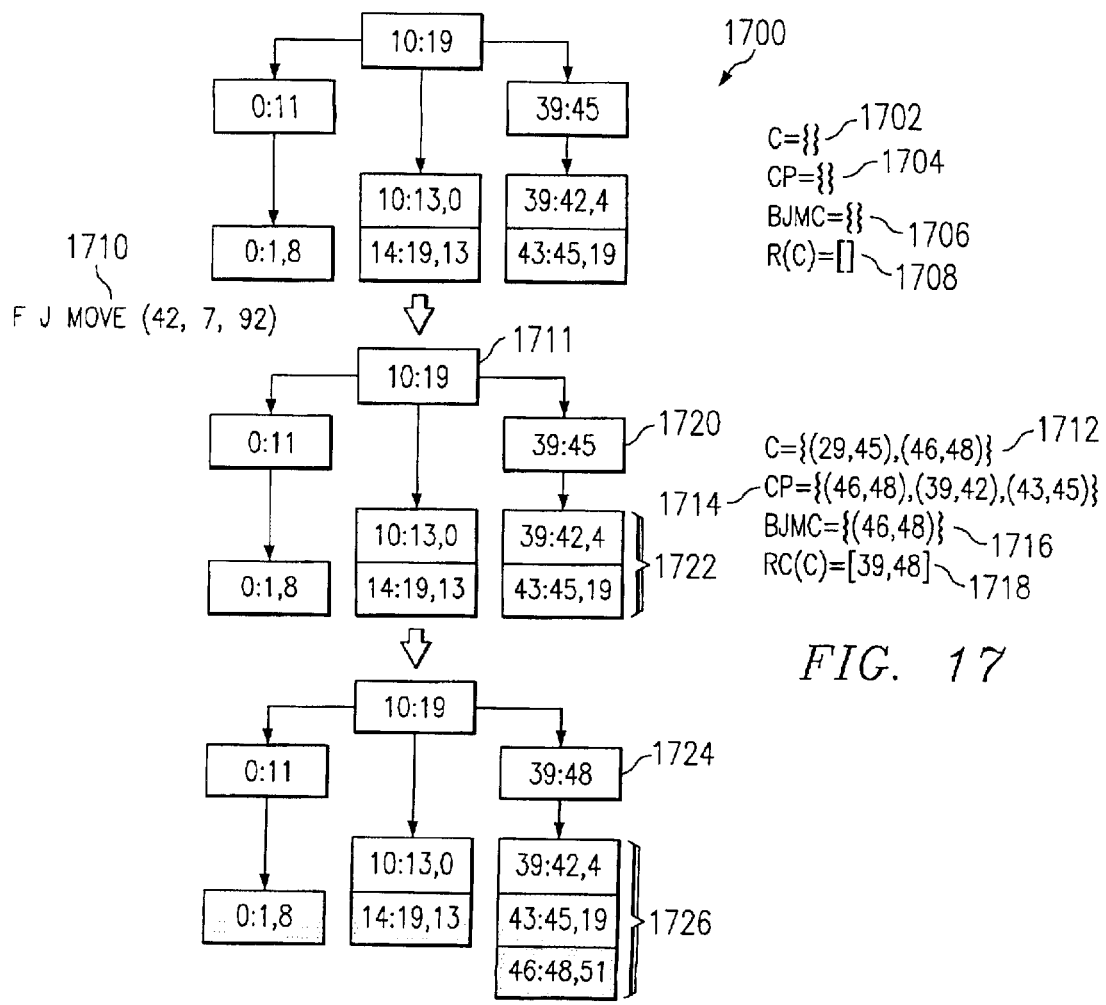
FIG. 17 is a diagram that provides an example of a process of updating a VBMJ in accordance with a preferred embodiment of the present invention.

FIG. 17 is a diagram that provides an example of a process of updating a VBMJ in accordance with a preferred embodiment of the present invention. The example starts with an existing VBMJ 1700 and data structures C 1702, CP 1704, and BJMC 1706. The range of C, R(C) 1708, is also shown for convenience.

A forward journal move 1710 is processed. The logical address range of move 1710, does not overlap at all with node 1711 but is located after the range of node 1711, so node 1720, the right child of node 1711, is examined. Node 1720 overlaps with the range of move 1710. Thus, the range of node 1720 is added to C 1712 and its PEL 1722 is added to CP 1714. As node 1720 is a leaf, the current input range, which is shortened from (42,48) to (46,48) by the proper decision rule from Table II, is inserted into C 1712, CP 1714, and BJMC 1716. Thus, the range of C, R(C) 1718, is [39, 48]. Node 1720 is then deleted from the VBMJ and replaced with a new node 1724, whose range is equivalent to R(C) 1718, and whose PEL 1726 includes all of the physical extents in CP 1714.

Figure 18:
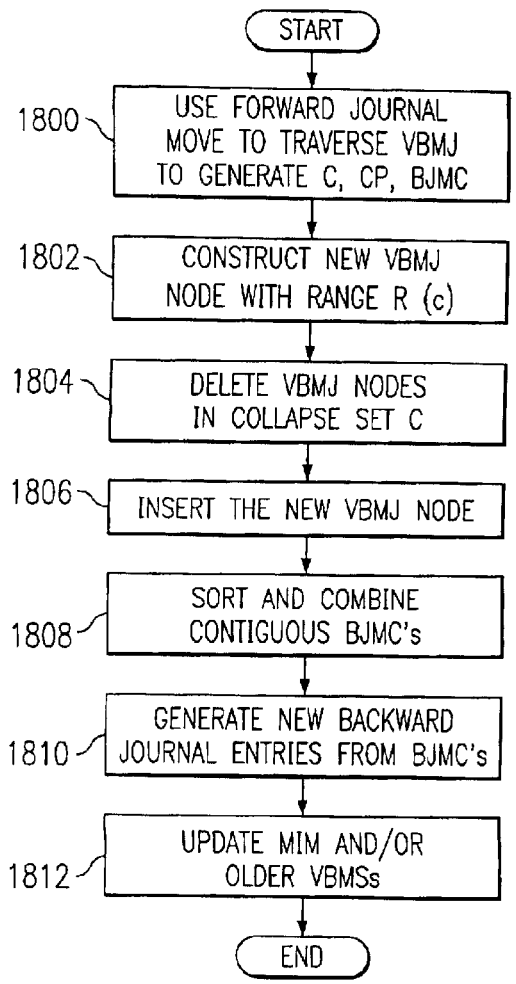
FIG. 18 is a flowchart representation of a process of updating a VBMJ and generating backward journal entries, according to a preferred embodiment of the present invention.

FIG. 18 is a flowchart representation of a process of updating a VBMJ and generating backward journal entries, according to a preferred embodiment of the present invention. First, the forward journal movelist is used to traverse the current VBMJ and generate C, CP, and BJMC according to the decision rules in Table II (step 1800). A new VBMJ node is generated with range R(C) (step 1802). The VBMJ nodes contained in C are deleted (step 1804). The new VBMJ node is inserted in place of the deleted nodes (step 1806). The BJMC set is sorted and contiguous BJMC entries are combined (step 1808). New backward journal entries are generated from the sorted, combined BJMC set (step 1810). Finally, the backward journal entries are used to update any older VBMJs that may exist (step 1812). After all VBMJs and VBMMs are updated to point to the backward journal rather than the MIM in accordance with the backward journal move list, then the forward journal move list is processed to update the MIM and create space in the forward journal as before.

Figure 19:
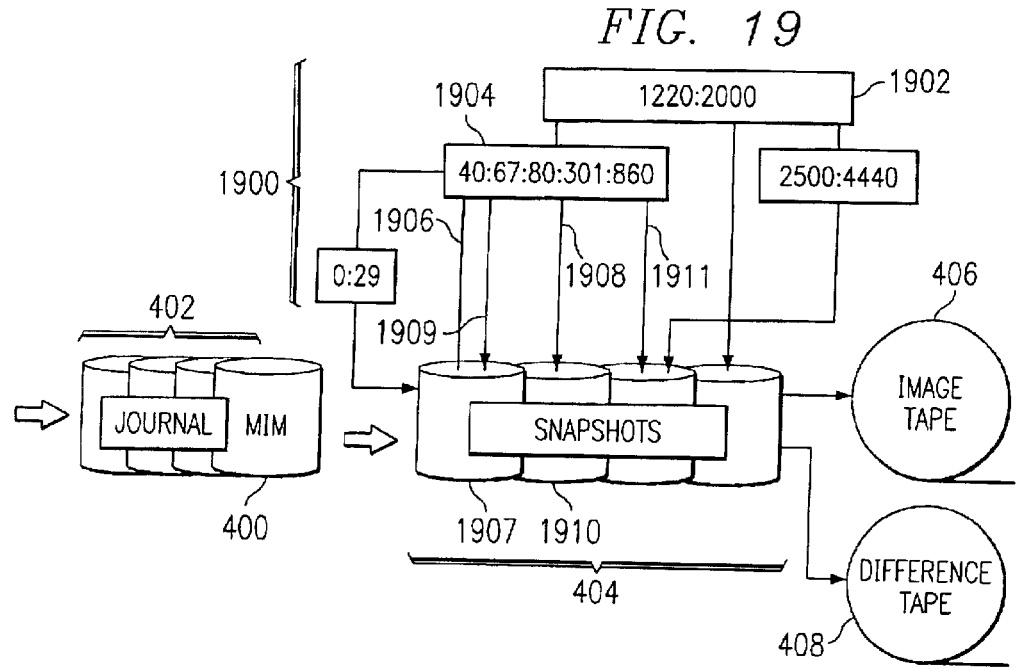
FIG. 19 depicts an exemplar multi-way VBMJ tree data structure for representing a mapping from logical storage device addresses to physical journal/snapshot addresses in accordance with a preferred embodiment of the present invention.

The VBMM and VBMJ data structures described here need not be constructed from simply binary trees. Multi-key, multi-pointer tree structures (such as B-trees or B+-trees) may be used instead, for greater retrieval efficiency. FIG. 19 depicts an exemplar multi-way VBMJ tree data structure (1900) for representing a mapping from logical storage device addresses to physical journal/snapshot addresses. Each of the nodes in tree 1900 represents a contiguous range of logical addresses, to be sure, but the data within the range need not be stored contiguously in the snapshots/journal entries. Instead, multiple pointers are provided from each node to represent each of a number of subranges making up the contiguous range of addresses. Thus, while node 1904 represents logical addresses from 40 to 860, there are pointers (1906, 1908, 1909, and 1911) pointing to physical representations of the subranges 40–66, 67–79, 80–300, and 301–859, respectively. Essentially, VBMJ 1900 is a VBMJ as described in FIG. 6 (VBMJ 602), but with the physical extent lists incorporated into the tree nodes themselves, rather than as leaves of binary tree nodes. In this way, node accesses can be reduced, since although each node represents a contiguous range of addresses, several different subranges may be identified by examining only one node. Using a multi-way tree, such as VBMJ 1900, reduces the number of memory or disk accesses used to retrieve nodes in the tree, and thus enhances the performance of the logical address mapping function.

Figure 20:
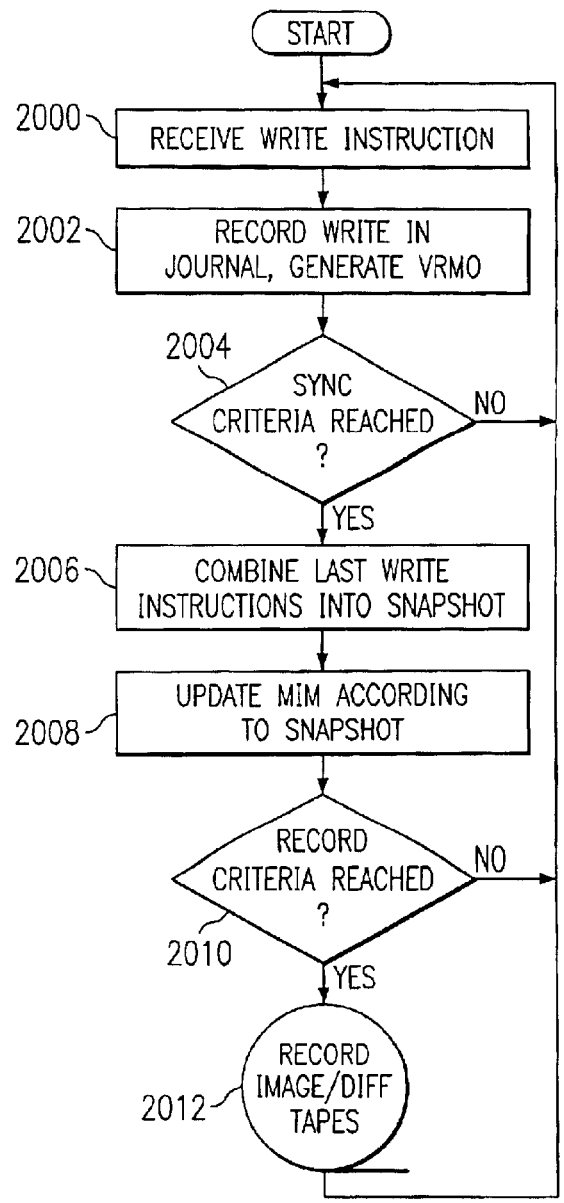
FIG. 20 is a flowchart representation of a process of generating storage replicas in accordance with a preferred embodiment of the present invention.

FIG. 20 is a flowchart representation of a process of generating storage replicas in accordance with a preferred embodiment of the present invention. One should note that the steps depicted in FIG. 20, although they are executed in sequence with respect to a single journaled write command, in a preferred embodiment they will actually be performed in parallel on multiple items of data. For example, write commands will continue to be written to the journal while older write commands are added to the VRMO. Thus, the preferred execution model is a "pipelined" or "assembly line" approach, where each step is performed simultaneously, but with respect to different items of data. First, an atomic write instruction is received from a controlling computer system (step 2000). The write instruction is written in a journal and a VRMO (virtual recovery mapping object) is generated (step 2002). Certain conditions can cause a forward journal movelist to be constructed, namely the lack of space for additional journal entries or the passage of a specified length of time (step 2004). If the criteria have not been met, the process cycles to step 2000. If so, however, the write instructions from the journal are combined to make a snapshot, which is stored in the collection of snapshots (step 2006). Next, the "mirror in the middle" (MIM) is updated to match the snapshot (step 2008). If a criterion for recording to removable media has been met (step 2010), then image and difference "tapes" (or disks, etc.) may be generated from the snapshots (step 2012). In either case, the process cycles again to step 2000. One should note that although steps 2010 and 2012 are shown here as part of a sequence of steps, steps 2010 and 2012 may, in fact, be performed asynchronously with respect to the generation of snapshots (i.e., at any time, not just following snapshot generation) or not at all.

One of ordinary skill in the art will recognize that a suitable control computer program may be utilized by a user or administrator to set the criteria for when MIM updates or tape-transfer events will occur. These events may be set to occur at a certain time of day or after a certain time-period has elapsed, or they may be set to coincide with other events, such synchronization of a database management system, for instance. One of ordinary skill in the art will recognize that the scheduling of synchronization and/or tape-transfer events may be performed in any manner desired without departing from the scope and spirit of the invention.

Figure 21:
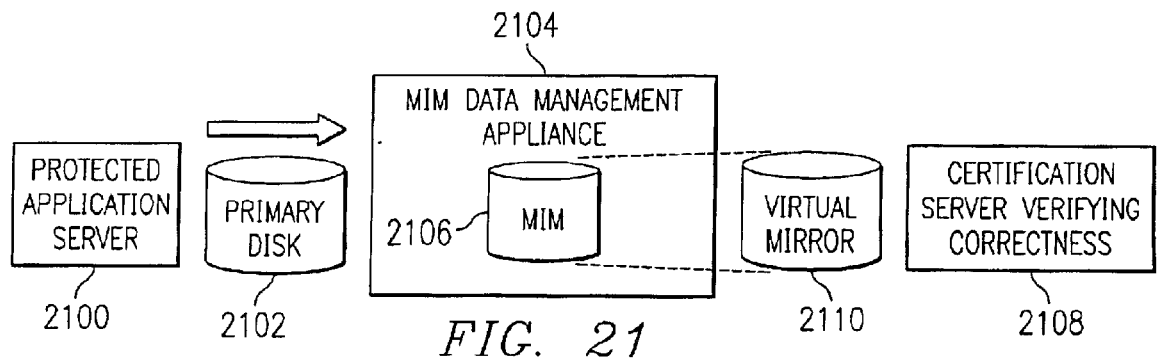
FIG. 21 is a diagram that depicts a process of monitoring a database for violation of consistency constraints in accordance with a preferred embodiment of the present invention.
Figure 22:
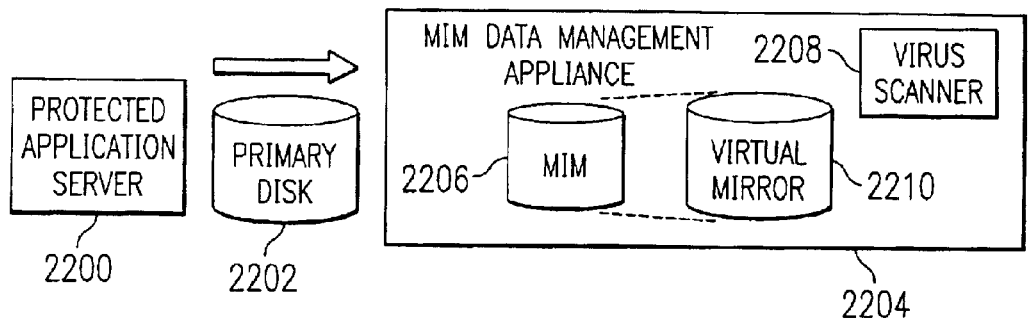
FIG. 22 depicts a system that monitors for viruses in accordance with a preferred embodiment of the present invention.
Figure 23:
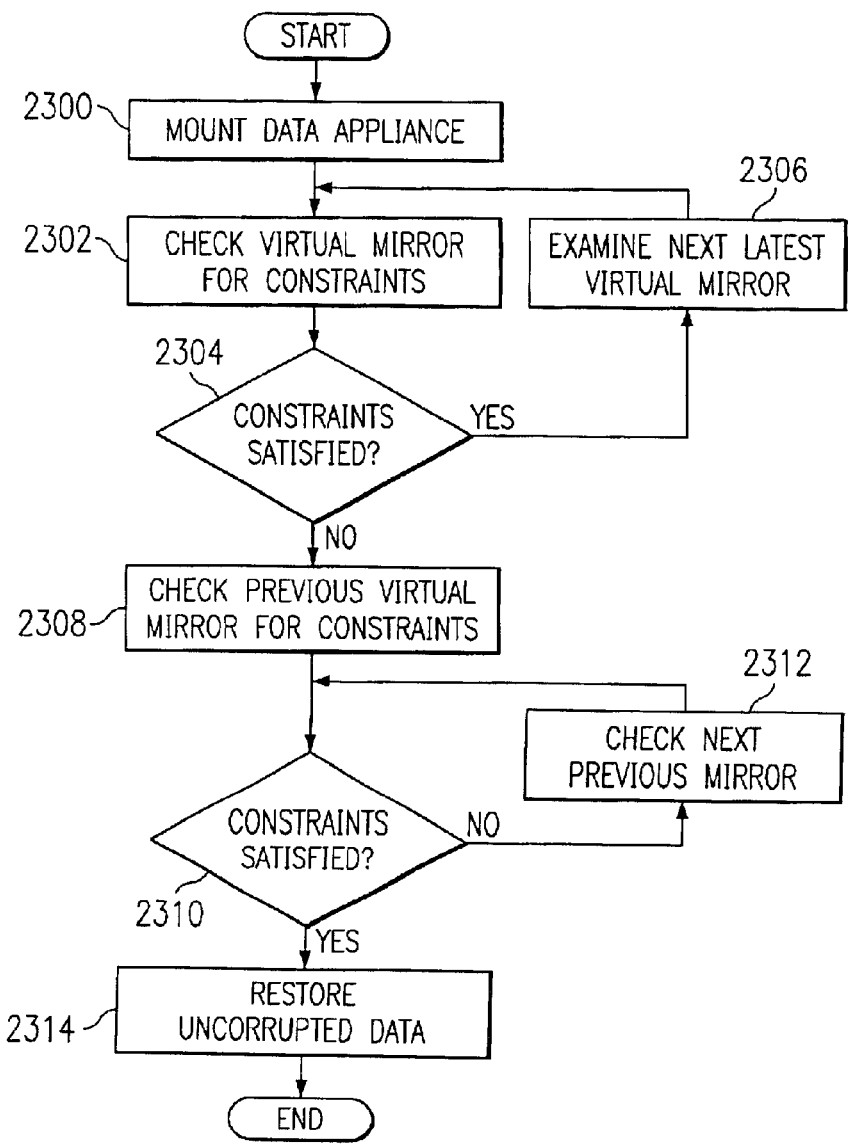
FIG. 23 is a flowchart representation of a process of monitoring for troublesome changes in data backed up by a data management appliance in accordance with a preferred embodiment of the present invention.

FIGS. 21–23 illustrate particular applications for a data management appliance in accordance with a preferred embodiment of the present invention. Having a data management appliance with the ability to retrieve mirrored versions of a storage device from the past makes it possible for a monitor process to monitor for a troublesome change in condition of the data stored on the storage device and for the corrupted data to be restored to its latest correct state.

For example, FIG. 21 depicts a process of monitoring a database for violation of consistency constraints (such as values falling out of specified ranges or spurious duplicate or ambiguous data, for example). An application server (2100) makes use of a database stored on primary disk 2102. Data management appliance 2104 stores virtual mirrors 2106 of primary disk 2102 over time. A certification server 2108 can mount data management appliance 2104 and examine each individual virtual mirror (such as virtual mirror 2110) for correctness. If a problem is located, primary disk 2102 can be restored with the latest correct virtual mirror stored by data management appliance 2104. In an alternative embodiment, certification server 2108 may simply be replaced by software operating on protected application server 2100 or data management appliance 2104.

Similarly, FIG. 22 depicts a system that monitors for viruses. Application server 2200 makes use of a filesystem stored on primary disk 2202. Data management appliance 2204 stores virtual mirrors 2206 of primary disk 2202 over time. Virus scanner software 2208 can scan each individual virtual mirror (such as virtual mirror 2210) for viruses (or every other mirror, or every third, etc.). If a problem is located, primary disk 2202 can be restored with the latest uninfected virtual mirror stored by data management appliance 2204.

FIG. 23 is a flowchart representation of a process of monitoring for troublesome changes in data backed up by a data management appliance in accordance with a preferred embodiment of the present invention. First, if the monitoring takes place external to the appliance itself, the external device mounts the data management appliance to be able to access its data (step 2300). A virtual mirror on the appliance is checked to see if it conforms to specified constraints (e.g., to be virus free, to be a consistent database, to be error free, etc.) (step 2302). If the constraints are satisfied (step 2304:Yes), the next virtual mirror in chronological order is examined (step 2306). If not (step 2304:No), then the mirror chronologically previous to the currently examined mirror is examined to see if it conforms to the constraints (step 2308). If it does not (step 2310:No), then the next previous mirror is examined (step 2312). If does (step 2310:Yes), then the uncorrupted data in the mirror is restored to the primary storage device (step 2314).

Figure 24:
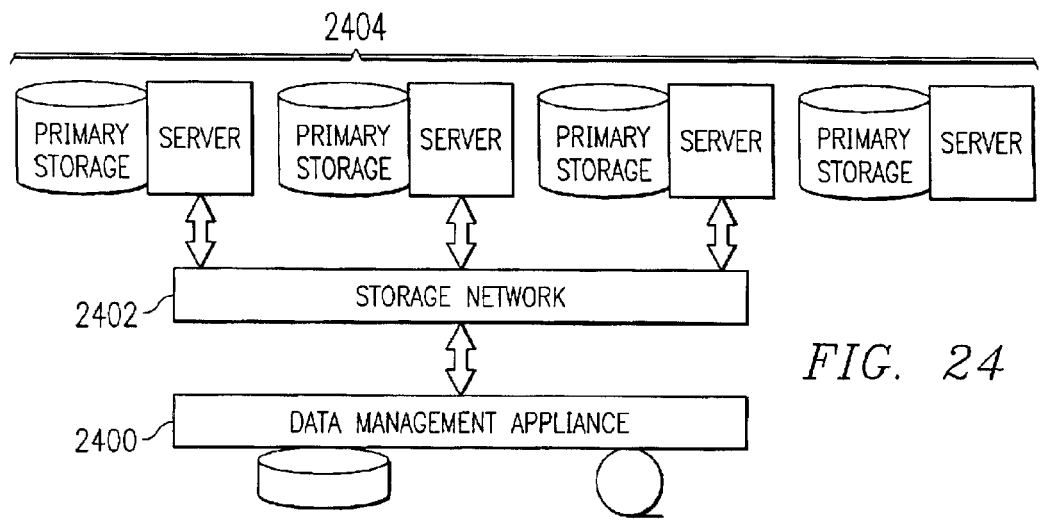
FIG. 24 is a diagram that depicts a single data management appliance attached to a storage network with multiple servers having attached primary storage devices being attached to a storage network in accordance with a preferred embodiment of the present invention.

One of ordinary skill in the art will recognize that a number of variations on present invention may be achieved without departing from the scope and spirit of the invention herein disclosed. For example, while the preceding figures described a single data management appliance used in conjunction with a single primary storage device and a single computer system, in fact, the present invention may be utilized in a scaled fashion, with multiple appliances, multiple primary storage devices, and/or multiple computer systems being connected together in a storage network. FIG. 24, for instance, depicts a single data management appliance (2400) attached to a storage network (2402) with multiple servers having attached primary storage devices (2404) being attached to storage network 2402. The primary storage devices may be mirrors of each other, or may possess different contents. All may shared the same data management appliance (2400).

Figure 25:
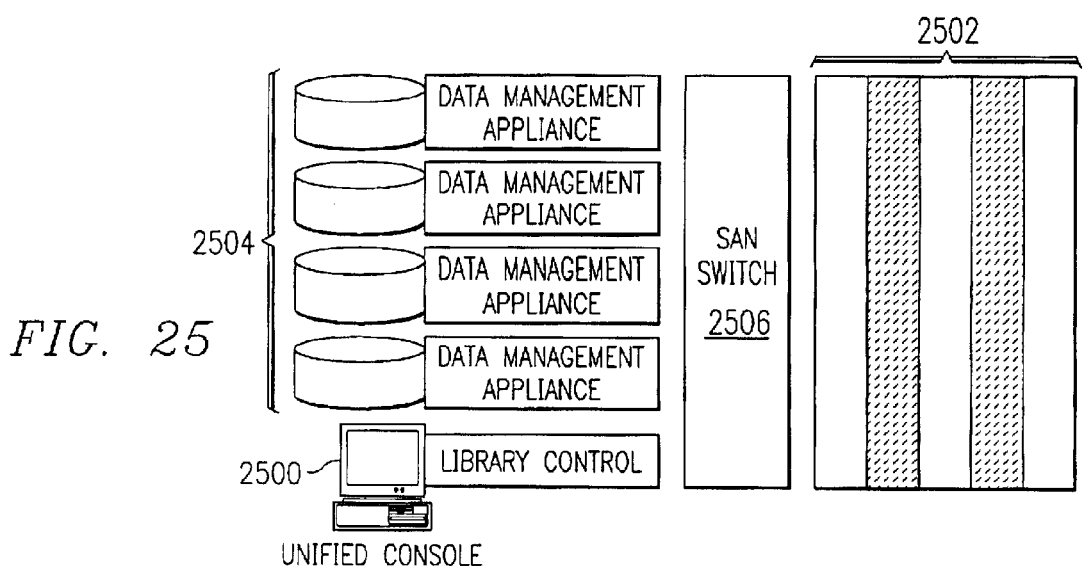
FIG. 25 is a diagram depicting a single computer system console controlling a single primary storage device that is being backed up by multiple data management appliances working in tandem through a storage area network in accordance with a preferred embodiment of the present invention.
Figure 26:
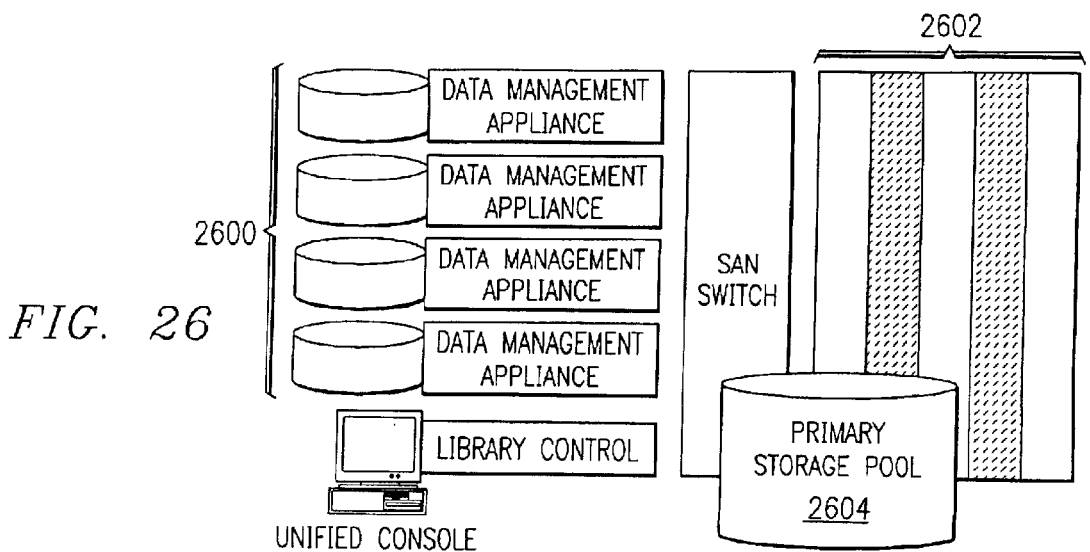
FIG. 26 is a diagram depicting a data processing system wherein the data management appliances share common pooled storage in accordance with a preferred embodiment of the present invention.

FIG. 25 depicts a single data management appliance console 2500 controlling multiple data management appliances 2504 which are managed as a single unit, without regard for the number of appliances actually included in the installation. This allows the capacity or activity level of primary storage to be increased without concurrently increasing the administrative effort required to keep the protection mechanism supplied by data management appliances 2504 operative. Tape library 2502 may be used to store image and difference tapes made from snapshots stored on data management appliances 2504. FIG. 26 shows a similar system wherein data management appliances 2600 share common pooled random access storage (2604).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data management appliance, comprising:
a random-access storage unit storing a forward journal and a backward journal; and
control circuitry adapted to receive commands from a host computer system, the control circuitry combining the commands to obtain a net change, the control circuitry deriving an inverse of the net change based on a starting address and lengths associated with the net change, the inverse of the net change recorded as a snapshot in the backward journal,
wherein in response to the control circuitry receiving a write command from the computer system, the control circuitry updates the random-access storage unit to include information associated with the write command and in response to a read command including a logical address and a time value, the control circuitry retrieves, from the random-access storage unit, data representing contents of the logical address at a time represented by the time value.

2. The data management appliance of claim 1, wherein the write commands are replicated from write commands issued to a primary storage device.

3. The data management appliance of claim 1, wherein the write commands are received from the computer system through a replicating controller.

4. The data management appliance of claim 1, wherein the write commands are replicated by the computer system.

5. The data management appliance of claim 1, wherein the random-access storage unit stores a mirror-in-the-middle (MIM) containing a copy of contents of a primary storage device at a fixed point in time.

6. The data management appliance of claim 5, wherein the random-access storage unit stores at least one snapshot containing changes, that when made to contents of the mirror-in-the-middle (MIM), would result in a previous version of the contents of the primary storage device.

7. The data management appliance of claim 6, wherein the control circuitry stores a mapping object, wherein the mapping object maps logical addresses into physical addresses on the mirror-in-the-middle (MIM) and contained in the at least one snapshot.

8. The data management appliance of claim 1, wherein the control circuitry receives commands from the computer system through a storage network.

9. The data management appliance of claim 1, wherein the random-access storage unit includes memory.

10. The data management appliance of claim 1, wherein the random-access storage unit includes a disk.

11. The data management appliance of claim 1 wherein a mirror-in-the-middle is updated to reflect the net change.

12. The data management appliance of claim 1, wherein the random-access storage unit stores at least one mapping object, each mapping object mapping logical addresses into physical addresses for a particular point in time.

13. A data management appliance, comprising: a random-access storage unit; and
control circuitry adapted to receive commands from a computer system,
wherein in response to the control circuitry receiving a write command from the computer system, the control circuitry updates the random-access storage unit to include information associated with the write command;
in response to a mount command including a time value, the control circuitry configures itself to perform future read operations with respect to a fixed time represented by the time value; and
in response to a read command including a logical address, the control circuitry retrieves, from the random-access storage unit, data representing contents of the logical address at the fixed time;
wherein the random-access storage unit stores a forward journal, and commands stored in the forward journal are combined to obtain a net change,
wherein a mirror-in-the-middle is updated to reflect the net change.

14. The data management appliance of claim 13, wherein the write commands are replicated from write commands issued to a primary storage device.

15. The data management appliance of claim 13, wherein the write commands are received from the computer system through a replicating controller.

16. The data management appliance of claim 13, wherein the write commands are replicated by the computer system.

17. The data management appliance of claim 13, wherein starting address and lengths associated with the net change are used to derive an inverse of the net change.

18. The data management appliance of claim 13, wherein the random-access storage unit stores a mirror-in-the-middle (MIM) containing a copy of contents of a primary storage device at a fixed point in time.

19. The data management appliance of claim 18, wherein the random-access storage unit stores at least one snapshot containing changes, that when made to contents of the mirror-in-the-middle (MIM), would result in a previous version of the contents of the primary storage device.

20. The data management appliance of claim 19, wherein the control circuitry stores a mapping object, wherein the mapping object maps logical addresses into physical addresses on the mirror-in-the-middle (MIM) and contained in the at least one snapshot.

21. The data management appliance of claim 13, wherein the control circuitry receives commands from the computer system through a storage network.

22. The data management appliance of claim 13, wherein the random-access storage unit includes memory.

23. The data management appliance of claim 13, wherein the random-access storage unit includes a disk.

24. The data management appliance of claim 13, wherein the random-access storage unit stores at least one mapping object, each mapping object mapping logical addresses into physical addresses for a particular point in time.

25. A data management appliance comprising:
a random-access storage unit storing a forward journal including a plurality of write commands and a backward journal; and
control circuitry adapted to receive the plurality of write commands from a computer system and to combine the plurality of write commands to obtain a net change, the control circuitry deriving an inverse of the net change based on starting address and lengths associated with the net change, the control circuit storing the inverse of the net change as a snapshot in the backward journal;
wherein in response to the control circuitry receiving a write command from the computer system, the control circuitry updates the random-access storage unit to include information associated with the write command;
in response to a mount command including a time value, the control circuitry configures itself to perform future read operations with respect to a fixed time represented by the time value; and
in response to a read command including a logical address, the control circuitry retrieves, from the random-access storage unit, data representing contents of the logical address at the fixed time.

26. A method of replicating data written to a data storage system, the method comprising:
creating a mirror-in-the middle (MIM) recording an exact copy of the data storage system at a fixed point in time;
recording a forward journal holding write events received since the fixed point in time;
receiving a request to access replicated data as the replicated data existed at a requested time, the requested time more recent than the fixed point in time; and
constructing a virtual recovery mapping object (VRMO) from the forward journal based on the requested time, the VRMO translating received logical addresses representing locations on the data storage system to physical locations of the replicated data, the VRMO implemented in a random access structure, the VRMO referencing replicated data as a copy of data written to the data storage system since the fixed point in time; wherein the random access structure is a multi-way search tree;

producing a plurality of snapshots from forward journal entries, the plurality of snapshots reflecting changes in the data storage system overtime;

storing the plurality of snapshots in a backward journal;

creating backward journal entries based on the VRMO and entries in the forward journal; and producing a new snapshot based on the backward journal entries and the VRMO.

27. The method of replicating data as in claim 26 wherein the random access structure is a binary search tree.

28. The method of replicating data as in claim 26 wherein the request to access replicated data is a read request.

29. The method of replicating data as in claim 26 wherein the request to access replicated data is a mount request.

30. The method of replicating data as in claim 26 further comprising: updating the MIM as each snapshot is produced; discarding forward journal entries used to update the MIM; and updating the fixed point in time.

31. The method of replicating data as in claim 26 wherein the VRMO is indexed with respect to blocks of data contained in the MIM.

32. The method of replicating data as in claim 26 wherein the VRMO is indexed with respect to logical addresses contained within the forward journal.

33. The method of replicating data as in claim 26 wherein the VRMO is one of a plurality of VRMOs, each VRMO based on a different requested time.

* * * * *